(12) United States Patent
Maeda

(10) Patent No.: US 11,892,050 B2
(45) Date of Patent: Feb. 6, 2024

(54) ANTI-VIBRATION DEVICE

(71) Applicant: Prospira Corporation, Kawasaki (JP)

(72) Inventor: Naoki Maeda, Tokyo (JP)

(73) Assignee: Prospira Corporation, Kawasaki (JP)

( * ) Notice: Subject to any disclaimer, the term of this patent is extended or adjusted under 35 U.S.C. 154(b) by 107 days.

(21) Appl. No.: 17/607,614

(22) PCT Filed: Nov. 25, 2019

(86) PCT No.: PCT/JP2019/046017
§ 371 (c)(1),
(2) Date: Oct. 29, 2021

(87) PCT Pub. No.: WO2020/250458
PCT Pub. Date: Dec. 17, 2020

(65) Prior Publication Data
US 2022/0221017 A1 Jul. 14, 2022

(30) Foreign Application Priority Data

Jun. 14, 2019 (JP) .................................. 2019-111087

(51) Int. Cl.
*F16F 1/387* (2006.01)
*B60K 5/12* (2006.01)
(52) U.S. Cl.
CPC ............ *F16F 1/387* (2013.01); *B60K 5/1208* (2013.01)
(58) Field of Classification Search
CPC ....................................................... F16F 1/387
See application file for complete search history.

(56) References Cited

U.S. PATENT DOCUMENTS

| 4,392,640 A * | 7/1983 | Kakimoto | ............... F16F 1/377 |
| | | | 267/141.2 |
| 4,471,935 A * | 9/1984 | Chiba | ..................... F16F 1/387 |
| | | | 248/638 |
| 2004/0060789 A1 | 4/2004 | Hamada | |
| 2015/0219175 A1 | 8/2015 | Eguchi | |

(Continued)

FOREIGN PATENT DOCUMENTS

| CN | 104937303 A | 9/2015 |
| CN | 205836418 U | 12/2016 |
| CN | 208101679 U | 11/2018 |

(Continued)

OTHER PUBLICATIONS

International Search Report for PCT/JP2019/046017 dated Dec. 24, 2019 [PCT/ISA/210].

(Continued)

*Primary Examiner* — Melody M Burch
(74) *Attorney, Agent, or Firm* — KENJA IP LAW PC

(57) ABSTRACT

An anti-vibration device including an outer cylinder 10; a shaft member 20 that is provided in the outer cylinder 10; and an elastic member 40 that links the outer cylinder 10 and the shaft member 20, in which the shaft member 20 has an inner cylinder and four stopper portions 30a to 30d that protrudes from a circumferential surface of the inner cylinder toward the outer cylinder 10 and that are mutually provided at intervals in a circumferential direction, and in which the elastic member 40 links the outer cylinder 10 and the shaft member 20 at a position between stopper portions that are adjacent to each other in the circumferential direction.

2 Claims, 2 Drawing Sheets

(56) References Cited

U.S. PATENT DOCUMENTS

| | | |
|---|---|---|
| 2018/0031069 A1 | 2/2018 | Kuroda et al. |
| 2018/0328433 A1 | 11/2018 | Nishi et al. |

FOREIGN PATENT DOCUMENTS

| | | | | |
|---|---|---|---|---|
| CN | 109353206 | A | 2/2019 | |
| CN | 208559006 | U | 3/2019 | |
| DE | 3840176 | A * | 5/1990 | ............. F16F 1/371 |
| DE | 112017002475 | T5 | 1/2019 | |
| FR | 2777613 | A1 * | 10/1999 | ............ F16F 1/3863 |
| JP | S6375429 | U | 5/1988 | |
| JP | 02093134 | A * | 4/1990 | |
| JP | 04-095139 | U | 8/1992 | |
| JP | 05-010359 | A | 1/1993 | |
| JP | H08284993 | A | 11/1996 | |
| JP | 10-078078 | A | 3/1998 | |
| JP | 11-072134 | A | 3/1999 | |
| JP | 2001295887 | A | 10/2001 | |
| JP | 2001-336575 | A | 12/2001 | |
| JP | 2010-048293 | A | 3/2010 | |
| JP | WO2015045041 | A1 | 3/2017 | |
| JP | 6149116 | B2 | 6/2017 | |
| JP | 2018-021580 | A | 2/2018 | |

OTHER PUBLICATIONS

Written Opinion for PCT/JP2019/046017 dated Dec. 24, 2019 [PCT/ISA/237].

Written Opinion of the International Searching Authority dated Dec. 24, 2019 in International Application No. PCT/JP2019/046017.

Dec. 6, 2022, search result of Office Action issued by the China National Intellectual Property Administration in the corresponding Chinese Patent Application No. 201980097482.8.

Jul. 21, 2023, search result of the Extended European Search Report issued by the European Patent Office in the corresponding European Patent Application No. 19932294.2.

* cited by examiner

ANTI-VIBRATION DEVICE

CROSS REFERENCE TO RELATED APPLICATIONS

This application is a National Stage of International Application No. PCT/JP2019/046017 filed Nov. 25, 2019, claiming priority based on Japanese Patent Application No. 2019-111087 filed Jun. 14, 2019.

TECHNICAL FIELD

The present invention relates to anti-vibration devices, and more particular to an anti-vibration device suitable for a mount of a drive source of a vehicle.

BACKGROUND ART

Conventionally, an anti-vibration device to be employed in a mount of a drive source of a vehicle, such an engine, a motor and the like, is configured such that a cylindrical outer cylinder and a substantially cylindrical shaft member inserted to be into the outer cylinder are linked and supported by an elastic member made of rubber, an input to the drive source generated due to behavior of the vehicle is absorbed by the elastic member to thereby prevent a vibration from being transmitted to a vehicle side.

As such an anti-vibration device, Patent Document 1 discloses that a shaft member is formed in a deformed shape so that a cross-section along an axial direction is recessed inwardly in a radial direction and that, by employing this shaft member, a free length of the elastic member from the outer cylinder to the shaft member is secured.

However, the above-mentioned anti-vibration device has a drawback that, since the cross-section along the axial direction is in the deformed shape, a production process and a cost are increased.

CITATION DOCUMENT

Patent Document

Patent Document 1: Japanese Unexamined Patent Application Publication No. 2018-21580.

SUMMARY OF THE INVENTION

Technical Problem

The present invention was made in view of the above-mentioned problem, and provides an anti-vibration device capable of improving a production efficiency while securing a free length of an elastic member required for an anti-vibration device.

Solution to Problem

As a configuration for solving the above-mentioned problem, there is provided an anti-vibration device including: a shaft member; and an elastic member that extends from the shaft member toward an outer side in a radial direction, in which the shaft member has an inner cylinder and four stopper portions that protrudes from a circumferential surface of the inner cylinder toward the outer side in the radial direction and that are mutually provided at intervals in a circumferential direction, and in which the elastic member contacts the shaft member at a position between stopper portions that are adjacent to each other in the circumferential direction.

Further, there is provided an anti-vibration device including: an outer cylinder; a shaft member that is provided in the outer cylinder; and an elastic member that links the outer cylinder and the shaft member, in which the shaft member has an inner cylinder and four stopper portions that protrudes from a circumferential surface of the inner cylinder toward an outer side in a radial direction and that are mutually provided at intervals in a circumferential direction, and in which the elastic member links the outer cylinder and the shaft member at a position between stopper portions that are adjacent to each other in the circumferential direction.

DESCRIPTION OF EMBODIMENTS

Hereinafter, the present invention will be described in detail through embodiments of the invention; however, the following embodiments are not intended to limit the inventions set forth in the claims, and all of combinations of the features described in the embodiments are not necessarily essential to the solving means of the invention.

As illustrated in each figure, an anti-vibration device 1 includes an outer cylinder 10, a shaft member 20 disposed within the outer cylinder 10, and an elastic member 40 that elastically links the outer cylinder 10 and the shaft member 20. The anti-vibration device 1 in this example is a device that is installed in plural numbers between a side surface of a drive source and a side surface forming a housing, when the drive source such as a motor is installed in the housing provided in a vehicle. In the following description, a case is exemplified, in which an object to be mounted on the vehicle is a motor, but the object may be a drive source such as an engine. In the following description, explanations with respect to directions will be given on the basis of a state in which the anti-vibration device 1 has been installed in the vehicle.

The outer cylinder 10 is made of a metal having high rigidity, such as aluminum, and is formed in a circular shape. One end side in an axial direction of the outer cylinder 10 is firmly fixed to the housing provided in the vehicle, for example, via a not-shown bracket, and the other end side is positioned so as to face the drive source.

Figure 1:
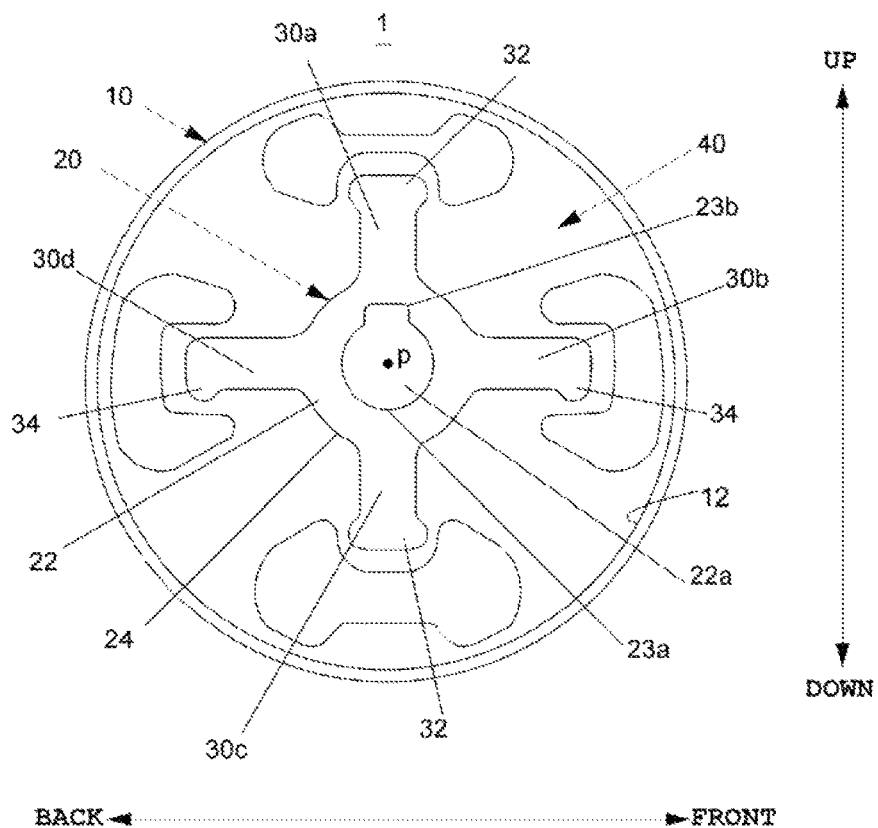
FIG. 1 is a schematic plan view of an anti-vibration device.
Figure 2:
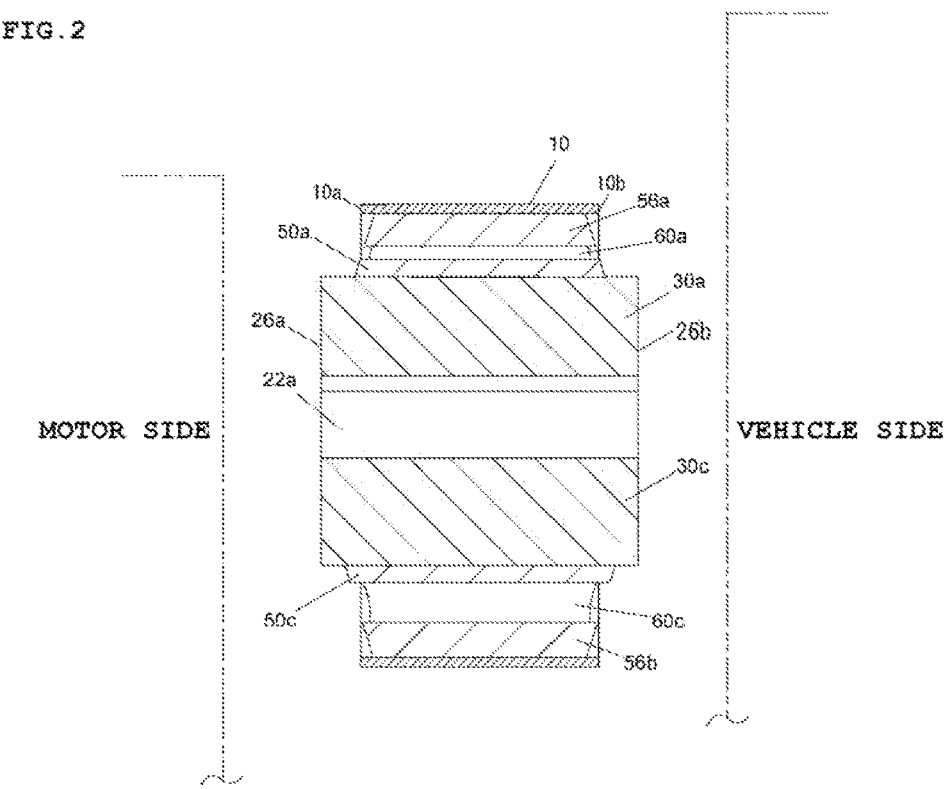
FIG. 2 is a cross-sectional view in an axial direction of the anti-vibration device.

As illustrated in FIG. 1, the shaft member 20, like the outer cylinder 10, is made of a metal having high rigidity such as aluminum, for example, and has an inner cylinder portion 22 positioned around a central axis of the outer cylinder 10, and four stopper portions 30a; 30b; 30c; 30d that extend so as to protrude from an outer circumferential surface 24 of the inner cylinder 22 toward an inner circumferential surface 12 of the outer cylinder 10. As illustrated in FIG. 2, the shaft member 20 extends continuously along the axial direction of the outer cylinder 10, that is, along a right and left direction orthogonal to a front and back direction and a vertical direction of the vehicle, and a dimension in the axial direction is set to be longer than a dimension in the axial direction of the outer cylinder 10. Specifically, the dimension of the shaft member 20 is so set that end surfaces 26a; 26b in the axial direction of the shaft member 20 substantially equally project in the axial direction from end edges 10a; 10b in the axial direction of the outer cylinder 10, respectively.

The inner cylinder portion 22 is formed to have a diameter smaller than an outer diameter of the outer cylinder 10, and a bolt hole 22a is formed on an inner circumference side thereof. The bolt hole 22a is a through hole that penetrates the inner cylinder 22 in the axial direction. The bolt hole 22a is formed by a perfectly circular hole wall 23a and a hole wall 23b that is convex toward a stopper portion 30a direction.

In bolt hole 22a, a not shown bolt, which has a cross-sectional shape substantially identical to a cross-sectional shape formed by the hole walls 23a; 23b, is inserted and fastened, and is firmly fixed (mounted) in a state in which a side surface of a not-shown drive source is in contact with the end surface 26a in the axial direction of the shaft member 20. Incidentally, before the drive source is mounted and fixed, a center point p of the bolt hole 22a has been set in advance at a position slightly displaced to a stopper portion 30a side (upper side) from a center point of the outer cylinder 10. On the other hand, when the drive source is mounted and fixed to the shaft member 20, the shaft member 20 is displaced by a load of the drive source toward a stopper portion 30c side (lower side), and the center point p and the center point of the outer cylinder 10 are substantially aligned on the same axis.

Next, an explanation will be given as to the stopper portions 30a; 30b; 30c; 30d (hereinafter sometimes referred to as 30a to 30d, and the like). As illustrated in FIG. 1, the stopper portions 30a to 30d extend so as to project from an outer circumferential surface 24 of the inner cylinder portion 22 toward the outer cylinder 10 side. Each of the stopper portions 30a to 30d is provided at equal intervals (90° intervals in the example shown in the figure) along the circumferential direction of the inner tube portion 22, and is arranged in a substantially cruciform in a plan view. Among the stopper portions 30a to 30d, extension directions of the stopper portions 30a; 30c are in line with a vertical direction of the vehicle, and extension directions of the stopper portions 30b; 30d are in line with a front and back direction (advance/retract direction) of the vehicle.

Each of the stopper portions 30a; 30c linearly extends in the vertical direction, and a tip end 32 on the outer cylinder 10 side has a shape which is widened in the front and back direction than the other parts thereof. Each of the stopper portions 30b; 30d linearly extends in the front and back direction, and a lower part of the tip end 34 on the outer cylinder 10 side has a shape which is widened downward. Incidentally, a significance of the widened shape of the tip ends 32; 34 will be explained in conjunction with the shape of the elastic member 40 described below.

Figure 3:
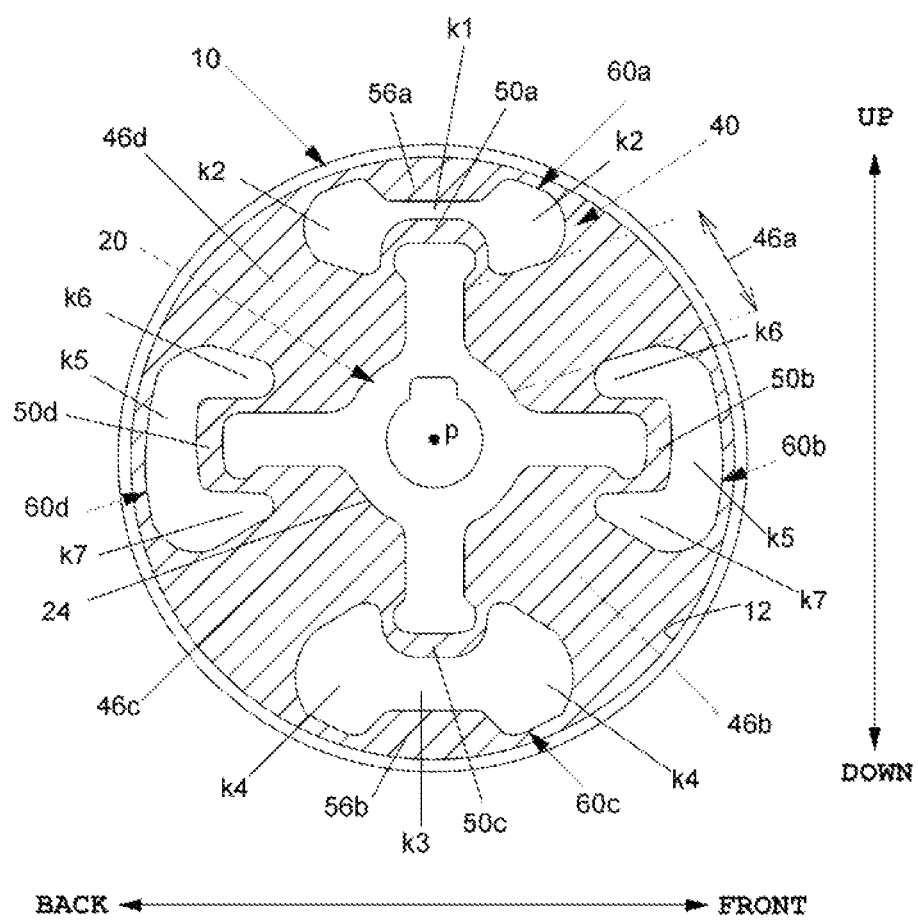
FIG. 3 is a cross-sectional view in a radial direction of the elastic member.

The outer cylinder 10 having the above-described configuration and the shaft member 20 arranged within the inner circumference of the outer cylinder 10 are integrated by the elastic member 40 filled in the outer cylinder 10. Hereafter, an explanation will be given as to the shape of the elastic member 40 with reference to FIG. 3 in particular. The elastic member 40 is a rubber that is filled using, as a mold frame, a not-shown shaft body that forms gap portions 60a; 60b; 60c; 60d so as to be in correspondence with the outer cylinder 10, the shaft member 20, and the stopper portions 30a; 30b; 30c; 30d. As the rubber having been filled is vulcanized, the outer cylinder 10 and the shaft member 20 are elastically integrated.

The elastic member 40 generally includes a plurality of linking portions 46a to 46d that extend in a radial direction over the inner circumferential surface 12 of the outer cylinder 10 and the outer circumferential surface 24 of the inner cylinder portion 22 of the shaft member 20, buffer portions 50a to 50d that are formed to cover the outer circumferential surfaces of the plurality of stopper portions 30a to 30d of the shaft member 20, outer buffer portions 56a; 56b that are formed on the inner circumferential surface 12 of the outer cylinder 10, and the gap portions 60a to 60d that are formed so as to correspond to each of the stopper portions 30a to 30d and which penetrate along the axial direction.

As shown by virtual lines, the linking portion 46a is a portion whose end on an outer side in the radial direction is in contact with the inner circumferential surface 12 of the outer cylinder 10 and whose end on an inner side in the radial direction is in contact, within a range between the stopper portion 30a and the stopper portion 30b, with the outer circumferential surface 24 of the inner cylinder 22 and an outer peripheral surface of a straight line part of the stopper portion 30a, and which extends upwardly and forwardly from the shaft member 20 toward the outer cylinder 10. The linking portion 46b is a portion whose end on the outer side in the radial direction is in contact with the inner circumferential surface 12 of the outer cylinder 10 and whose end on the inner side in the radial direction is in contact, within a range between the stopper portion 30b and the stopper portion 30c, with the outer circumferential surface 24 of the inner cylinder 22 and an outer peripheral surface of a straight line part of the stopper portion 30c, and extends downwardly and forwardly from the shaft member 20 toward the outer cylinder 10. The linking portion 46c is a portion whose end on the outer side in the radial direction is in contact with the inner circumferential surface 12 of the outer cylinder 10 and whose end on the inner side in the radial direction being in contact, within a range between the stopper portion 30c and the stopper portion 30d, with the outer circumferential surface 24 of the inner cylinder 22 and an outer peripheral surface of a straight line part of the stopper portion 30c, and extends downwardly and backwardly from the shaft member 20 toward the outer cylinder 10. The linking portion 46d is a portion, an end of which on the outer side in the radial direction whose end on the outer side in the radial direction is in contact with the inner circumferential surface 12 of the outer cylinder 10 and whose end on the inner side in the radial direction being in contact, within a range between the stopper portion 30d and the stopper portion 30a, with the outer circumferential surface 24 of the inner cylinder portion 22 and an outer peripheral surface of a straight line part of the stopper portion 30a, and extends upwardly and backwardly from the shaft member 20 toward the outer cylinder 10.

Among the above-mentioned linking portions 46a to 46d, free lengths of the upwardly positioned linking portions 46a; 46d are set slightly longer than free lengths of the downwardly positioned linking portions 46b; 46c in a no-load state, which is a state in which the load of the motor is not applied. On the other hand, when the load of the motor is applied, the upwardly positioned linking portions 46a; 46d are pulled downward and the downwardly positioned linking portions 46b; 46c are compressed downward, thus the free lengths of all the linking portions 46a to 46d are substantially equalized, and each of the linking portions 46a to 46d becomes able to exhibit the elastic force in a well-balanced manner against inputs applied to the shaft member 20 from the vertical direction, the front and back direction, or a composite input of the inputs from these directions.

As described above, because the linking portions 46a to 46d of the elastic member 40 according to the present embodiment are configured to extend between the outer cylinder 10 and the shaft member 20 within the region formed between the cruciform stopper portions 30a to 30d arranged along the circumferential direction, the free length, which is the dimension in the radial direction from the outer cylinder 10 to the shaft member 20, can be secured sufficiently, and spring characteristics (for example, spring ratio, durability, load durability, and so on) of the elastic member 40 can be finely tuned in accordance with characteristics of vibration of the motor, which is generated by behaviors of the vehicle during driving, braking, steering and the like.

Next, an explanation will be given as to the buffer portions 50a to 50d. The buffer portions 50a to 50d are portions that correspond to the widened tip ends 32; 34 of the stopper portions 30a; 30b; 30c; 30d, and that are formed to cover the periphery of the widened tip ends 32; 34. The buffer portions 50a; 50c, which correspond to the upper and lower tip ends 32; 32, are substantially arcuate thick portions that are respectively opposed to each other, sandwiching gap portions 60a; 60c described later, in the vertical direction to the outer buffer portions 56a; 56b formed on the inner circumferential surface 12 of the outer cylinder 10. The buffer portions 50a; 50c mitigate and absorb the impact when the stopper portions 30a; 30c approach and abut against the outer cylinder 10 side due to the displacement (input) of the shaft member 20 toward the vertical direction caused mainly by the behavior of the vehicle toward the vertical direction. In addition, as the tip ends 32; 32 have been widened, areas of the thick portions are increased and thus the buffer range (abutment range) is extended.

The buffer portions 50b; 50d that correspond to the front and back tip ends 34; 34 are substantially rectangular-shaped thick portions that are respectively opposed to each other, sandwiching gap portions 60b; 60d described later, in the front and back direction to the inner circumferential surface 12 of the outer cylinder 10. The buffer portions 50b; 50d mitigate and absorb the impact when the stopper portions 30b; 30d approach and abut against the outer cylinder 10 side due to the displacement (input) of the shaft member 20 in the front and back direction caused mainly by the behavior of the vehicle in the front and back direction. In addition, since lower portions of the tip ends 34; 34 are widened downward in an arc shape, areas of the thick portions, especially of the downward thick portion is increased, hence the buffer range against the downward input, which becomes dominant when the vehicle is running, is expanded. Upper parts of the tip ends 34; 34 may also be widened, however, when taking the rubber flow into consideration, it is preferable to have the shape that is widened downward only.

The outer buffer portions 56a; 56b are thick portions that respectively protrude, sandwiching the gap portions 60a; 60c, toward the buffer portions 50a; 50c side on the inner side in the radial direction. As described above, since the gap portions 60a; 60c and the buffer portions 50a; 50c, which are formed respectively on the stopper portions 30a; 30c, are opposed to each other in the vertical direction and are made thick, when the stopper portions 30a; 30c approach the outer cylinder 10 side, the thick buffer portions 50a; 50c and the outer buffer portions 56a; 56b abut against each other while mitigating and absorbing the impact, hence the anti-vibration performance against the input in the vertical direction is enhanced. Further, in comparison with the inner circumferential surface 12 of the outer cylinder 10 that opposes the stopper portions 30b; 30d in the front and back direction, thick portions corresponding to the outer buffer portions 56a; 56b have not been formed on the inner circumferential surface 12.

This is because the following was taken into consideration. Namely, because the displacement direction of the stopper portions 30a; 30c against the input in the vertical direction is substantially limited to the vertical direction, and the buffer portions 50a; 50c respectively abut against the outer buffer portions 56a; 56b in a substantially right-opposite manner, whereas at the time when an input in the front and back direction is applied, an input component in the vertical direction coexists, thus the displacement directions of the stopper portions 30b; 30d are not stable and blurring occurs. On the other hand, the thickness of the buffer portions 50b; 50d that correspond to the stopper portions 30b; 30d is made slightly thicker than that of the buffer portions 50a; 50c, so that the displacement is sufficiently mitigated and absorbed even in a case where the stopper portions 30b; 30d are displaced in the front and back direction with blurring in the vertical direction and abut against the inner circumferential surface 12 of the outer cylinder 10.

Next, an explanation will be given as to the gap portions 60a; 60c, which are formed in the elastic member 40 and arranged by being separated upwardly and downwardly. The gap portion 60a is a space provided between the buffer portion 50a formed on the stopper portion 30a and the outer buffer portion 56a formed on the outer cylinder 10 side. The gap portion 60a has a buffer section k1 which is formed by peripheral walls extending linearly in the right and left direction and vertically facing with each other and which allows the abutment between the buffer portion 50a and the outer buffer portion 56a in response to an upward input, and a regulation section k2 which is formed symmetrically in the front and back direction of the buffer section k1 and is formed by peripheral walls extending in a substantially spade-shaped manner. The shape of the regulating section k2 can be changed as necessary in consideration of the load of the motor to be mounted, the characteristics of the vehicle, or the rubber flow at the time when the rubber is filled.

The gap portion 60c is a space provided between the buffer portion 50c formed on the stopper portion 30c and the outer buffer portion 56b formed on the outer cylinder 10 side. The gap portion 60c, like the gap portion 60a, has a buffer section k3 which is formed by peripheral walls extending linearly in the right and left direction and which allows the abutment between the buffer portion 50c and the outer buffer portion 56b in response to a downward input, and a regulation section k4 which is formed symmetrically in the front and back direction of the buffer section k3 and is formed by peripheral walls extending in a substantially spade-shaped manner. The overall shape of the buffer section k3 and the regulation section k4 is enlarged in comparison with the buffer section k1 and the regulation section k2 of the gap portion 60a located above to thereby increase a clearance. This is set so as to cope with the downward input that becomes dominant when the vehicle is running.

Next, an explanation will be given as to the gap portions 60b; 60d. Incidentally, since the gap portions 60b; 60d are formed symmetrically, the explanation will be given using one gap portion 60b as an example. The gap portion 60b is a space provided between the buffer portion 50b formed on the stopper portion 30b and the rubber formed on the inner circumferential surface 12 of the outer cylinder 10. The gap portion 60b has a buffer section k5 which is formed by a peripheral wall extending in an arc shape in the vertical direction along the inner circumferential surface 12 of the outer cylinder 10 and which allows the abutment between the buffer portion 50b and the rubber formed on the inner circumferential surface 12 of the outer cylinder 10 in response to a forward input, and restriction sections k6; k7 which are formed upward and downward of the buffer section k5 and formed by a peripheral wall that tapers and extends toward a direction of the center point p of the inner cylinder 22. In comparison with the regulation section k6 and the regulation section k7 in terms of the shape thereof, the arc on the center point p side forming the regulation section k6 is set to be a gentler arc shape than the arc on the center point p side forming the regulation section k7. This prevents stress concentration from occurring, especially in response to the downward input.

As explained above, with the anti-vibration device 1 according to the present embodiment, since the shaft member 20 has four stopper portions 30a to 30d that protrude from the outer circumferential surface 24 of the inner cylinder portion 22 toward the outer cylinder 10 and that are mutually provided at intervals in the circumferential direction, or in other words, radially extended with the center of the inner cylinder portion 22 as a base point, and the plurality of linking portions 46a to 46d of the elastic member 40 link the outer cylinder 10 and the shaft member 20 at the position between each of the stopper portions 30a to 30d which are adjacent to each other in the circumferential direction, respectively, the free lengths of the linking portions 46a to 46d are secured, hence the degree of freedom in tuning the spring characteristics of the elastic member 40 can be improved. In addition, since the cross-section in the axial direction is constant, the shaft member 20 can be manufactured continuously by extrusion molding or the like, thus the production efficiency can be improved.

Further, since the outer buffer portions 56a; 56b that are formed by the elastic member 40 and that protrude toward the tip ends 32; 32, respectively, are provided on the inner circumferential surface 12 of the outer cylinder 10 opposing the tip ends 32; 32 of the stopper portions 30a; 30c extending in the vertical direction, a sufficient buffering effect can be obtained against the input in the vertical direction, hence the anti-vibration effect can be improved. Incidentally, portions corresponding to the outer buffer portions 56a; 56b may be formed on the inner circumferential surface 12 of the outer cylinder 10 opposing the tip ends 34; 34 of the stopper portions 30b; 30d extending in the front and back direction, however, in consideration of the above-mentioned reason, it may be configured not to be provided with such portions.

Further, as the downwardly projecting widened parts are formed on the tip ends 34; 34 of the stopper portions 30b; 30d that extend in the front and back direction, the buffering range for particularly dominant downward inputs can be enlarged.

In summary, the present invention can be described as follows. That is, an anti-vibration device according to an aspect of the invention includes: a shaft member; and an elastic member that extends from the shaft member toward an outer side in a radial direction, in which the shaft member has an inner cylinder and four stopper portions that protrudes from a circumferential surface of the inner cylinder toward the outer side in the radial direction and that are mutually provided at intervals in a circumferential direction, and in which the elastic member contacts the shaft member at a position between stopper portions that are adjacent to each other in the circumferential direction.

According to this configuration, since the elastic member contacts the shaft member at the position between stopper portions that are adjacent to each other in the circumferential direction, the free length of the elastic member to the shaft member can be secured without the need to make the cross-sectional shape of the shaft member to be deformed, and the shaft member can be obtained continuously by extrusion molding or the like, thus the production efficiency can be improved.

An anti-vibration device according to another aspect of the invention includes: an outer cylinder; a shaft member that is provided in the outer cylinder; and an elastic member that links the outer cylinder and the shaft member, in which the shaft member has an inner cylinder and four stopper portions that protrudes from a circumferential surface of the inner cylinder toward an outer side in a radial direction and that are mutually provided at intervals in a circumferential direction, and in which the elastic member links the outer cylinder and the shaft member at a position between stopper portions that are adjacent to each other in the circumferential direction.

Further, the anti-vibration device may be configured such that the four stopper portions respectively protrude in a vertical direction corresponding to a vibration direction of an object and in a front and back direction, and, on an inner circumferential surface of the outer cylinder facing a tip end of a stopper portion that extends in the vertical direction, a buffer portion is provided, which is formed by the elastic member and which protrudes toward a tip end side.

Further, the anti-vibration device may be configured such that the four stopper portions respectively protrude in a vertical direction corresponding to a vibration direction of an object and in a front and back direction, and on an inner circumferential surface of the outer cylinder facing a tip end of a stopper portion that extends in the vertical direction, a buffer portion is provided, which is formed by the elastic member and protrudes toward a tip end side.

Further, the anti-vibration device may be configured such that, on a tip end of a stopper portion that extends in the front and back direction among the four stopper portions, a widened part that protrudes downward is formed.

REFERENCE SIGN LIST

1: Anti-vibration device, 10: Outer cylinder, 12: Inner circumferential surface, 20: Shaft member, 22: Inner cylinder portion, 30a to 30d: Stopper portion, 32; 34: Tip end, 40: Elastic member, 46a-46d: Linking portion, 50a-50d: (inner side) Buffer portion, 56a; 56b: Outer buffer portion.

The invention claimed is:

1. An anti-vibration device comprising:
an outer cylinder;
a shaft member that is provided in the outer cylinder; and
an elastic member that elastically integrates the outer cylinder and the shaft member,
wherein the shaft member has an inner cylinder and four stopper portions that protrude from a circumferential surface of the inner cylinder toward an outer side in a radial direction and that are mutually provided at intervals in a circumferential direction,
wherein the elastic member elastically integrates the outer cylinder and the shaft member at a position between stopper portions that are adjacent to each other in the circumferential direction,
wherein two stopper portions of the four stopper portions protrude in a vertical direction corresponding to a vibration direction of an object and remaining two stopper portions of the four stopper portions protrude in a front and back direction, and wherein, on a tip end of each of the remaining two stopper portions extending in the front and back direction, a widened part that protrudes downward is formed and a widened part that protrudes upward is not formed.

2. The anti-vibration device according to claim 1, wherein, on an inner circumferential surface of the outer cylinder facing a tip end of each of the two stopper portions extending in the vertical direction, a buffer portion is provided, which is formed by the elastic member and which protrudes toward a tip end side.

* * * * *